United States Patent
Zakai

(12) 
(10) Patent No.: US 6,788,099 B2
(45) Date of Patent: Sep. 7, 2004

(54) SYSTEM AND METHOD FOR EFFECTIVELY IMPLEMENTING AN ACTIVE TERMINATION CIRCUIT IN AN ELECTRONIC DEVICE

(75) Inventor: Rehan A. Zakai, San Ramon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/320,050

(22) Filed: Dec. 16, 2002

(65) Prior Publication Data

US 2004/0066210 A1 Apr. 8, 2004

Related U.S. Application Data

(60) Provisional application No. 60/416,646, filed on Oct. 7, 2002.

(51) Int. Cl.[7] .............................................. H03K 19/003
(52) U.S. Cl. .............................. 326/30; 326/86; 326/83; 326/26; 327/108; 327/65; 375/288
(58) Field of Search .............................. 326/30, 83, 86, 326/90, 26, 27; 375/288, 257; 327/108, 65, 563

(56) References Cited

U.S. PATENT DOCUMENTS

| | | | |
|---|---|---|---|
| 5,939,904 A | * 8/1999 | Fetterman et al. | ............ 327/67 |
| 6,005,895 A | * 12/1999 | Perino et al. | ............... 375/288 |
| 6,069,523 A | * 5/2000 | Brown | ........................ 327/563 |
| 6,236,247 B1 | 5/2001 | Ngo | ............................ 327/110 |
| 6,285,221 B1 | 9/2001 | Leighton et al. | ............ 327/110 |
| 6,346,832 B1 | * 2/2002 | Young | ........................ 327/108 |
| 2004/0000924 A1 | * 1/2004 | Best et al. | ..................... 326/30 |

* cited by examiner

*Primary Examiner*—Vibol Tan
(74) *Attorney, Agent, or Firm*—Gregory J. Koerner; Simon & Koerner LLP

(57) ABSTRACT

A system and method for effectively transferring electronic information in an electronic device may include a transmission line that connects a source device and a destination device. The foregoing transmission line may be implemented to include a conductor A and a conductor B for transferring the electronic information. One or more active termination circuits may coupled to conductor A and conductor B for being dynamically switched between a differential mode termination configuration and a single-ended mode termination configuration with respect to the transmission line. Control logic may be configured to dynamically place the active termination circuit into the foregoing differential mode termination configuration during a differential transmission mode. Alternately, the control logic may place the active termination circuit into the foregoing single-ended mode termination configuration during a single-ended transmission mode.

40 Claims, 6 Drawing Sheets

Fig. 4        410

SYSTEM AND METHOD FOR EFFECTIVELY IMPLEMENTING AN ACTIVE TERMINATION CIRCUIT IN AN ELECTRONIC DEVICE

CROSS-REFERENCE TO RELATED APPLICATIONS

This Application relates to, and claims priority in, U.S. Provisional Patent Application Serial No. 60/416,646, entitled "Active Termination Circuit For High Speed Transmission Lines Carrying Small Signals," filed on Oct. 7, 2002. The foregoing related application is commonly assigned, and is hereby incorporated by reference.

BACKGROUND SECTION

1. Field of the Invention

This invention relates generally to techniques for transferring electronic information, and relates more particularly to a system and method for effectively implementing an active termination circuit in an electronic device.

2. Description of the Background Art

Implementing effective methods for transferring electronic information is a significant consideration for designers and manufacturers of contemporary electronic systems. However, effectively implementing electronic systems may create substantial challenges for system designers. For example, enhanced demands for increased transfer functionality and performance may require additional hardware resources. An increase in hardware requirements may also result in a corresponding detrimental economic impact due to increased production costs and operational inefficiencies.

Furthermore, enhanced system capability to perform various advanced transfer operations may provide additional benefits to a system user, but may also place increased demands on the control and management of various system components. For example, an enhanced electronic system that effectively supports a hard-disk drive may benefit from an efficient implementation because of the large amount and complexity of the digital data involved.

Due to growing demands on system resources and substantially increasing data magnitudes, it is apparent that developing new techniques for implementing and performing transfer operations is a matter of concern for related electronic technologies. Therefore, for all the foregoing reasons, developing effective systems for implementing and transferring electronic information remains a significant consideration for designers, manufacturers, and users of contemporary electronic systems.

SUMMARY

In accordance with the present invention, a system and method are disclosed for effectively implementing an active termination circuit in an electronic device. In one embodiment of the present invention, a source device and a destination device from an electronic system may bi-directionally communicate through a transmission line that includes a conductor A and a conductor B.

The electronic system may perform high-speed data transmissions by simultaneously using both conductor A and conductor B to transfer two corresponding differential data signals in a differential transmission mode. In addition, the electronic system may alternately use conductor A and conductor B to separately transfer individual single-ended signals in a single-ended transmission mode. In accordance with the present invention, at least one active termination circuit may be coupled to conductor A and conductor B, and appropriate control logic may then advantageously cause the active termination circuit to operate in either a differential termination configuration or a single-ended termination configuration to optimize transmissions over conductor A and conductor B.

During the differential transmission mode, current sources of the active termination circuit may be turned on, and the active termination circuit may create a differential mode termination resistance across conductor A and conductor B to effectively terminate the transmission line. The differential mode termination resistance may be selected to match an impedance of the transmission line to thereby optimize transmissions of high-speed differential data in the differential transmission mode.

Furthermore, during the single-ended transmission mode, the current sources of the active termination circuit may be turned off, and the active termination circuit may responsively create high-value single-ended mode termination resistances between conductor A and electrical ground potential, and between conductor B and electrical ground potential, to thereby effectively isolate the separate individual signals transferred over the transmission line by essentially creating an open circuit between conductor A and conductor B.

During a differential/single-ended mode transition procedure, the transmission line may initially be operating in a differential transmission mode to transfer differential signals from a source device to a destination device. The source device may indicate a change of transmission mode by utilizing any appropriate means, and the control logic of the destination device may responsively detect the change of transmission mode in any effective manner. Current sources from the active termination circuit may then be turned off by the control logic in response to detecting the indicated change of transmission mode.

The active termination circuit may dynamically switch from a differential mode termination configuration to a single-ended mode termination configuration in response to the control logic turning off the foregoing current sources. Then, the source device may advantageously transmit single-ended signals over the transmission line to the destination device, in accordance with the present invention.

During a single-ended/differential mode transition procedure, the transmission line may initially be operating in a single-ended transmission mode to transfer separate and individual signals from a source device to a destination device. The source device may indicate a change of transmission mode by utilizing any appropriate means, and the destination device may responsively detect the change of transmission mode in any effective manner. The control logic may then turn on the current sources of the active termination circuit in response to detecting the indicated change of transmission mode.

The active termination circuit may then dynamically switch from a single-ended mode termination configuration to a differential mode termination configuration in response to the control logic turning on the foregoing current sources. The source device may then advantageously transmit corresponding differential signals over the transmission line to the destination device, in accordance with the present invention. The present invention therefore provides an improved system and method for effectively implementing an active termination circuit in an electronic device.

DETAILED DESCRIPTION

The present invention relates to an improvement in electronic information transfer techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively transferring electronic information in an electronic device, and may include a transmission line that connects a source device and a destination device. The foregoing transmission line may be implemented to include a conductor A and a conductor B for transferring electronic information.

One or more active termination circuits may coupled to conductor A and conductor B for being dynamically switched between a differential mode termination configuration and a single-ended mode termination configuration with respect to the transmission line. Control logic may be configured to dynamically place the active termination circuit into the foregoing differential mode termination configuration during a differential transmission mode. Alternately, the control logic may place the active termination circuit into the foregoing single-ended mode termination configuration during a single-ended transmission mode.

Figure 1:
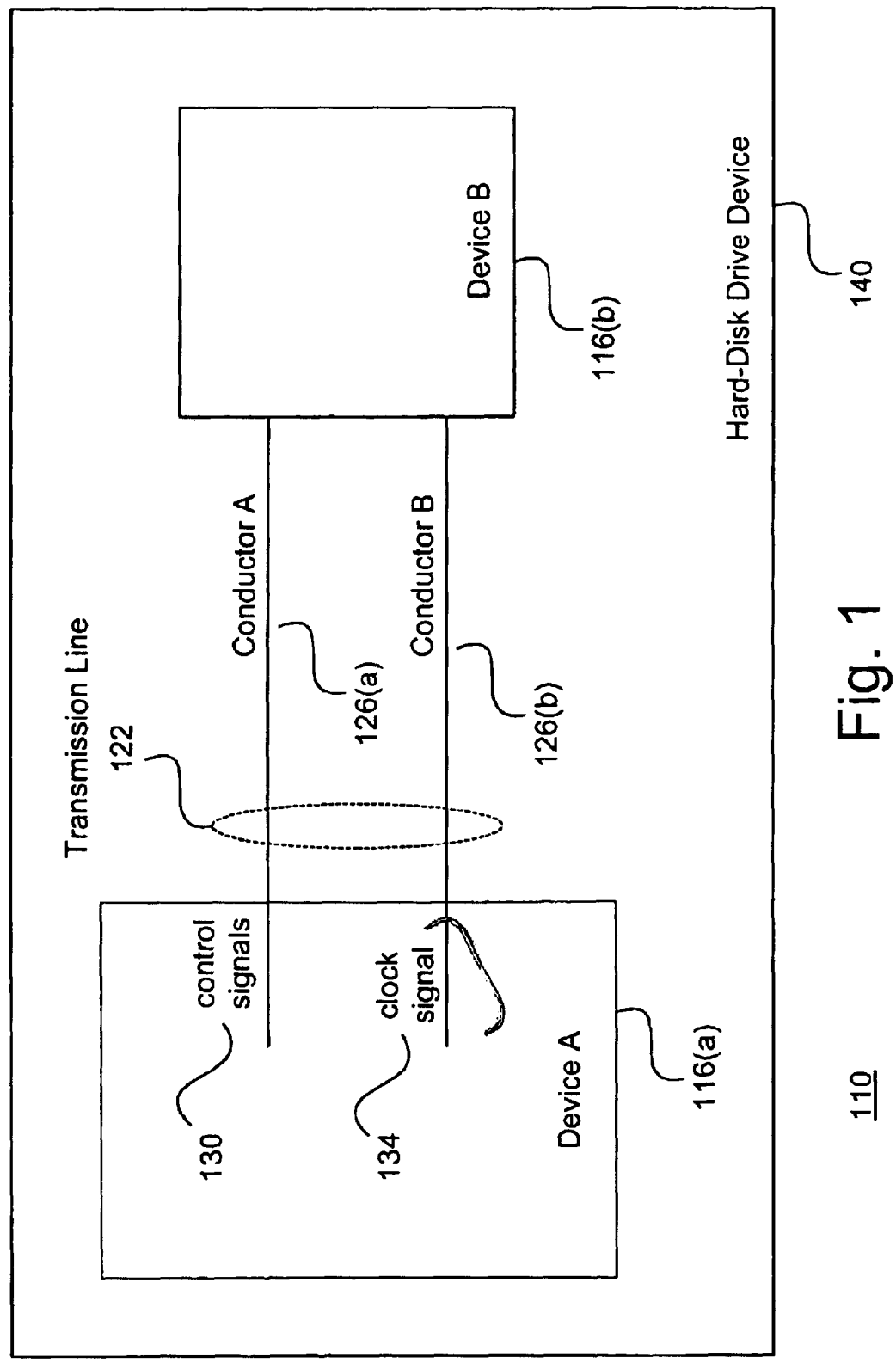
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may preferably include, but is not limited to, a device A 116(a), a device B 116(b), and a transmission line 122. In alternate embodiments, electronic system 110 may readily be implemented using various components and configurations in addition to, or instead of, those discussed in conjunction with the FIG. 1 embodiment.

In accordance with the present invention, device A 116(a) and device B 116(b) may be implemented as any type of electronic entity, circuit, or other appropriate device. For example, in certain embodiments, device A 116(a) may be implemented as a mother integrated circuit (mother chip) that includes various control circuitry for a hard-disk drive device 140. Similarly, device B 116(b) may be implemented as a daughter integrated circuit (daughter chip) that includes a relatively small pre-amplification circuit for mounting in close proximity to a read/write head in the foregoing hard-disk drive device 140.

In the FIG. 1 embodiment, device A 116(a) and device B 116(b) may bi-directionally communicate through a transmission line 122 that includes a conductor A 126(a) and a conductor B 126(b). In accordance with the present invention, it is desirable to minimize the number of conductors 126 in transmission line 122. Therefore, electronic system 110 may perform high-speed data transmissions by simultaneously using both conductor A 126(a) and conductor B 126(b) to transfer two related differential data signals in a differential transmission mode. In certain embodiments, the high-speed data transmissions may occur at data rates in the approximate range of 1 gigabits per second.

In addition, electronic system 110 may also alternately use conductor A 126(a) and conductor B 126(b) of transmission line 122 to separately transfer individual single-ended signals in a single-ended transmission mode. For example, in certain embodiments, conductor B 126(b) may be utilized to transfer a clock signal 134 while conductor A 126(a) may be utilized to transfer appropriate control signals 130 and status signals. The functionality and implementation of electroonic system 110 is further discussed below in conjunction with FIGS. 2 through 6.

Figure 2:
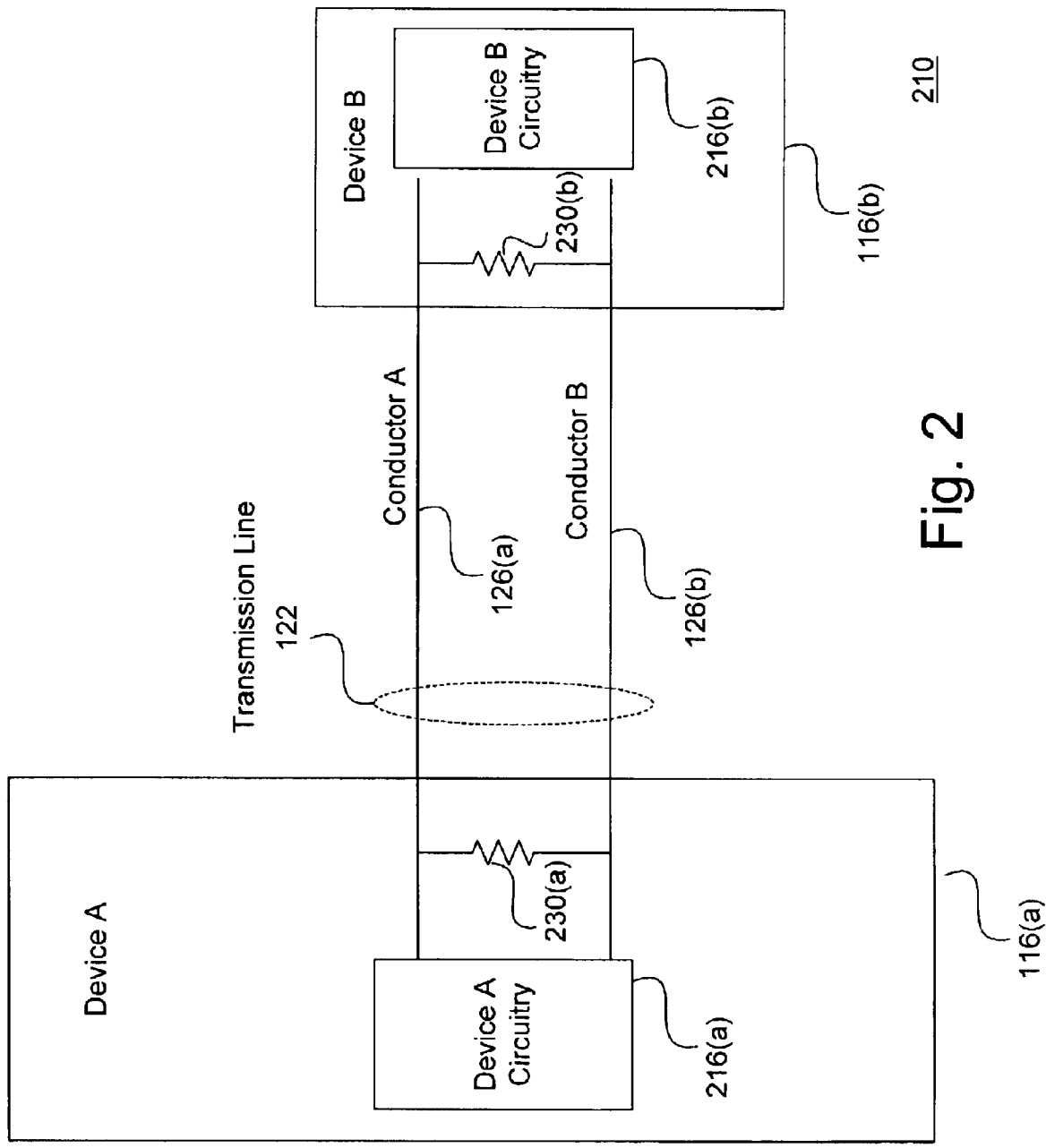
FIG. 2 is a schematic diagram of a differential mode termination configuration, in accordance with one embodiment of the present invention.

Referring now to FIG. 2, a schematic diagram of a differential mode termination configuration 210 is shown, in accordance with one embodiment of the present invention. In alternate embodiments, the present invention may readily utilize differential mode termination configurations using various components and architectures in addition to, or instead of, those discussed in conjunction with the FIG. 2 embodiment.

In the FIG. 2 drawing, a device A 116(a), a device B 116(b), and a transmission line 122 are shown. The device A 116(a), device B 116(b), and transmission line 122 of FIG. 2 may be implemented in the same or similar manner to those identically-numbered elements that are shown in FIG. 1, and any comments or descriptions made with regard to the foregoing elements are incorporated herein by reference.

In addition, the differential mode termination configuration 210 of FIG. 2 may include a differential mode termination resistance 230(a) for terminating transmission line 122 at device A 116(a). Similarly, the differential mode termination configuration 210 of FIG. 2 may include a differential mode termination resistance 230(b) for terminating transmission line 122 at device B 116(b). In certain embodiments, various differential mode termination configurations may be alternately implemented with a differential mode termination resistance 230 at only one end of transmission line 122.

In accordance with the present invention, differential mode termination resistance 230(a) and differential mode termination resistance 230(b) may be selected to match the impedance of transmission line 122 to thereby optimize the transmission of high-speed data in a differential mode. In high-speed transfers, the correct matching of impedances with appropriate termination resistances becomes increasingly important to prevent corruption of corresponding transfer data.

However, the differential mode termination configuration 210 of FIG. 2 is not appropriate for utilization during single-ended mode operations because individual and separate signals are typically being transferred across conductor A 126(a) and conductor B 126(b). Utilizing differential mode termination resistance 230(a) and differential mode termination resistance 230(b) to connect conductor A 126(a) and conductor B 126(b) would effectively couple the separate signals that are being transferred across conductor A 126(a) and conductor B 126(b) in the single-ended transmission mode.

Accordingly, the present invention may utilize one or more appropriate active termination circuits to function as differential mode termination resistance 230(a) and/or differential mode termination resistance 230(b) during the foregoing differential mode. In accordance with the present invention, the active termination circuit(s) may then dynamically switch from the FIG. 2 differential mode termination configuration 210 into a single-ended mode termination configuration during various single-ended transmission modes. The foregoing single-ended mode termination configuration is discussed below in conjunction with FIG. 3. Furthermore, the implementation and utilization of active termination circuits is further discussed below in conjunction with FIGS. 3–6.

Figure 3:
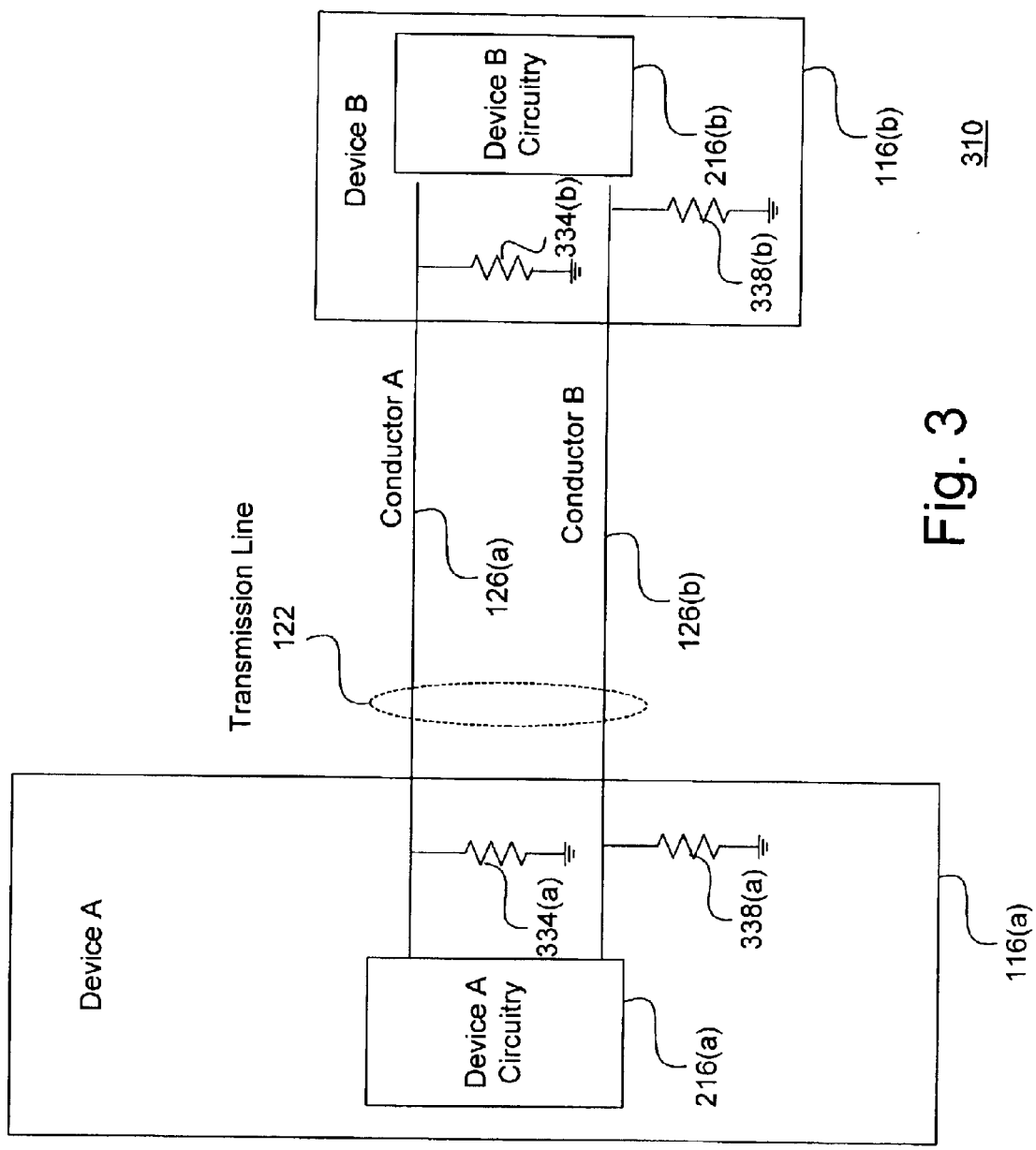
FIG. 3 is a schematic diagram of a single-ended mode termination configuration, in accordance with one embodiment of the present invention.

Referring now to FIG. 3, a schematic diagram of a single-ended mode termination configuration 310 is shown, in accordance with one embodiment of the present invention. In alternate embodiments, the present invention may readily utilize single-ended mode termination configurations using various components and architectures in addition to, or instead of, those discussed in conjunction with the FIG. 3 embodiment.

In the FIG. 3 drawing, a device A 116(a), a device B 116(b), and a transmission line 122 are shown. The device A 116(a), device B 116(b), and transmission line 122 of FIG. 3 may be implemented in the same or similar manner to those identically-numbered elements that are shown in FIGS. 1 and 2, and any comments or descriptions made with regard to the foregoing elements are incorporated herein by reference.

In addition, the single-ended mode termination configuration 310 of FIG. 3 includes a single-ended mode termination resistance 334(a) and a single-ended mode termination resistance 334(b) for terminating conductor A 126(a) at device A 116(a) and device B 116(b), respectively. Similarly, the single-ended mode termination configuration 310 of FIG. 3 includes a single-ended mode termination resistance 338(a) and a single-ended mode termination resistance 338(b) for terminating conductor B 126(b) at device A 116(a) and device B 116(b), respectively. In certain embodiments, various single-ended mode termination configurations may be implemented with single-ended mode termination resistances 334 and 338 at only one end of transmission line 122.

In accordance with the present invention, single-ended mode termination resistance 334(a) and single-ended mode termination resistance 338(a) may be implemented to essentially provide an open circuit between conductor A 126(a) and conductor B 126(b) to thereby isolate the transmission of separate single-ended signals in a single-ended mode. Similarly, single-ended mode termination resistance 334(b) and single-ended mode termination resistance 338(b) may be implemented to essentially provide an open circuit between conductor A 126(a) and conductor B 126(b) to thereby isolate the transmission of separate single-ended signals in a single-ended mode. In single-ended transfers, the isolation of individual signals on conductor A 126(a) and conductor B 126(b) is important to prevent corruption of corresponding electronic information.

Accordingly, the present invention may utilize appropriate active termination circuits to function as single-ended mode termination resistance 334(a) and single-ended mode termination resistance 338(a) during the foregoing single-ended mode. Similarly, the present invention may also utilize appropriate active termination circuits to function as single-ended mode termination resistance 334(b) and single-ended mode termination resistance 338(b) during the foregoing single-ended mode.

In accordance with the present invention, the active termination circuit(s) may then dynamically switch from the FIG. 3 single-ended mode termination configuration 310 into the FIG. 2 differential mode termination configuration 210 to flexibly provide an appropriate transmission mode termination configuration for electronic system 110. The foregoing single-ended mode termination configuration 310 is further discussed below in conjunction with FIGS. 4 and 5.

Figure 4:
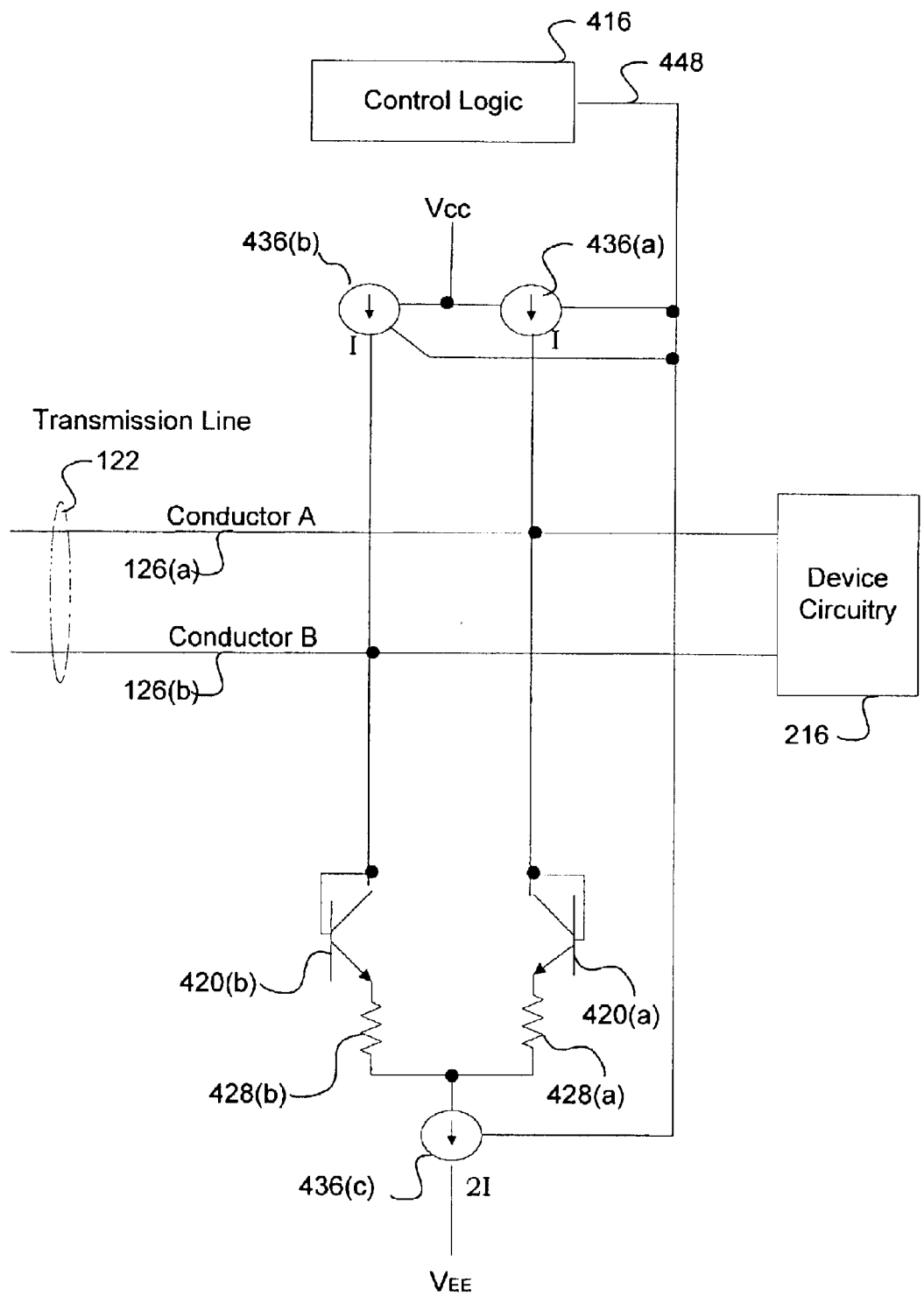
FIG. 4 is a schematic diagram of an active termination circuit, in accordance with one embodiment of the present invention.

Referring now to FIG. 4, a schematic diagram of an active termination circuit 410 is shown, in accordance with one embodiment of the present invention. In alternate embodiments, active termination circuit 410 may readily be implemented using various components and configurations in addition to, or instead of, those discussed in conjunction with the FIG. 4 embodiment.

In the FIG. 4 embodiment of active termination device 410, a transistor A 420(a) may be configured as a diode device by directly connecting the base of transistor A 420(a) to the collector of transistor A 420(a). In the FIG. 4 embodiment, transistor A 420(a) may be implemented as an NPN transistor device. A current source A 436(a) may then be directly connected to the collector of transistor A 420(a). The emitter of transistor A 420(a) may then be connected to a first end of an emitter resistor A 428(a), while the second end of the emitter resistor A 428(a) may be connected to a current source C 436(c) which sources twice the current sourced by current source A 436(a).

In the FIG. 4 embodiment, a transistor B 420(b) may be similarly configured as a diode device by directly connecting the base of transistor B 420(b) to the collector of transistor B 420(b). In the FIG. 4 embodiment, transistor B 420(b) may be implemented as an NPN transistor device. A current source B 436(b) may then be directly connected to the collector of transistor B 420(b). In the FIG. 4 embodiment, current source B 436(b) may source the same amount of current as the foregoing current source A 436(a). The emitter of transistor B 420(b) may then be connected to a first end of an emitter resistor B 428(b). The second end of the emitter resistor B 428(b) may be directly connected to the foregoing current source C 436(c) by a connecting line which is also directly connected to the foregoing second end of the foregoing emitter resistor A 428(a).

In the FIG. 4 embodiment, conductor A 126(a) of transmission line 122 (see FIGS. 1–3) may be connected to the line that runs between current source A 436(a) and the collector of transistor A 420(a). Conductor A 126(a) may also be coupled to device circuitry 216 (see FIGS. 1–3). Similarly, conductor B 126(b) of transmission line 122 (see FIGS. 1–3) may be connected to the line that runs between current source B 436(b) and the collector of transistor B 420(b). Conductor B 126(b) may also be coupled to device circuitry 216 (see FIGS. 1–3). In the FIG. 4 embodiment, device circuitry 216 may be implemented as either device circuitry A 216(a) of device A 116(a), and/or as device circuitry B 216(b) of device B 116(b).

In the FIG. 4 embodiment, control logic 416 may include any appropriate elements or entities for controlling the operation of active termination circuit 410. In certain embodiments, control logic 416 may place current sources 436(a–c) into an on-state or into an off-state to thereby place active termination circuit in either a differential mode termination configuration (see FIG. 2), or a single-ended mode termination configuration (see FIG. 3). In the FIG. 4 embodiment, control logic 416 may control current sources 436(a–c) by means of a control line 448.

Control logic 416 may place current sources 436(a–c) into an on-state or into an off-state in response to any appropriate information from electronic system 110. Control logic 416 may responsively turn on current sources 436(a–c) to activate the differential mode termination configuration shown and discussed above in conjunction with the foregoing FIG. 2. Alternately, control logic 416 may responsively turn off current sources 436(a–c) to activate the single-ended mode termination configuration shown and discussed above in conjunction with foregoing FIG. 3.

In accordance with the present invention, during the foregoing differential transmission mode with current sources 436(a–c) turned on, a differential mode termination resistance (illustrated previously as differential mode termination resistance 230 of FIG. 2) may advantageously be created across conductor A 126(a) and conductor B 126(b) to effectively terminate transmission line 122. The differential mode termination resistance may be selected to match the impedance of transmission line 122 to thereby optimize the transmission of high-speed data in a differential transmission mode. In the FIG. 4 embodiment, control logic 416 may utilize control line 448 to provide a bias control to current sources 436(a–c) to thereby specify a particular termination resistance value for the differential mode termination resistance in the differential transmission mode.

Also in accordance with the present invention, during the foregoing single-ended transmission mode with current sources 436(a–c) turned off, high-value single-ended mode termination resistances (illustrated previously as single-ended mode termination resistances 334 and 338 of FIG. 3) may advantageously be created between conductor A 126(a) and ground, and between conductor B 126(b) and ground, to thereby effectively isolate separate individual signals transferred on transmission line 122 by essentially creating an open circuit between conductor A 126(a) and conductor B 126(b). The isolation of individual signals on conductor A 126(a) and conductor B 126(b) therefore advantageously prevents corruption of the corresponding transferred electronic information.

Figure 5:
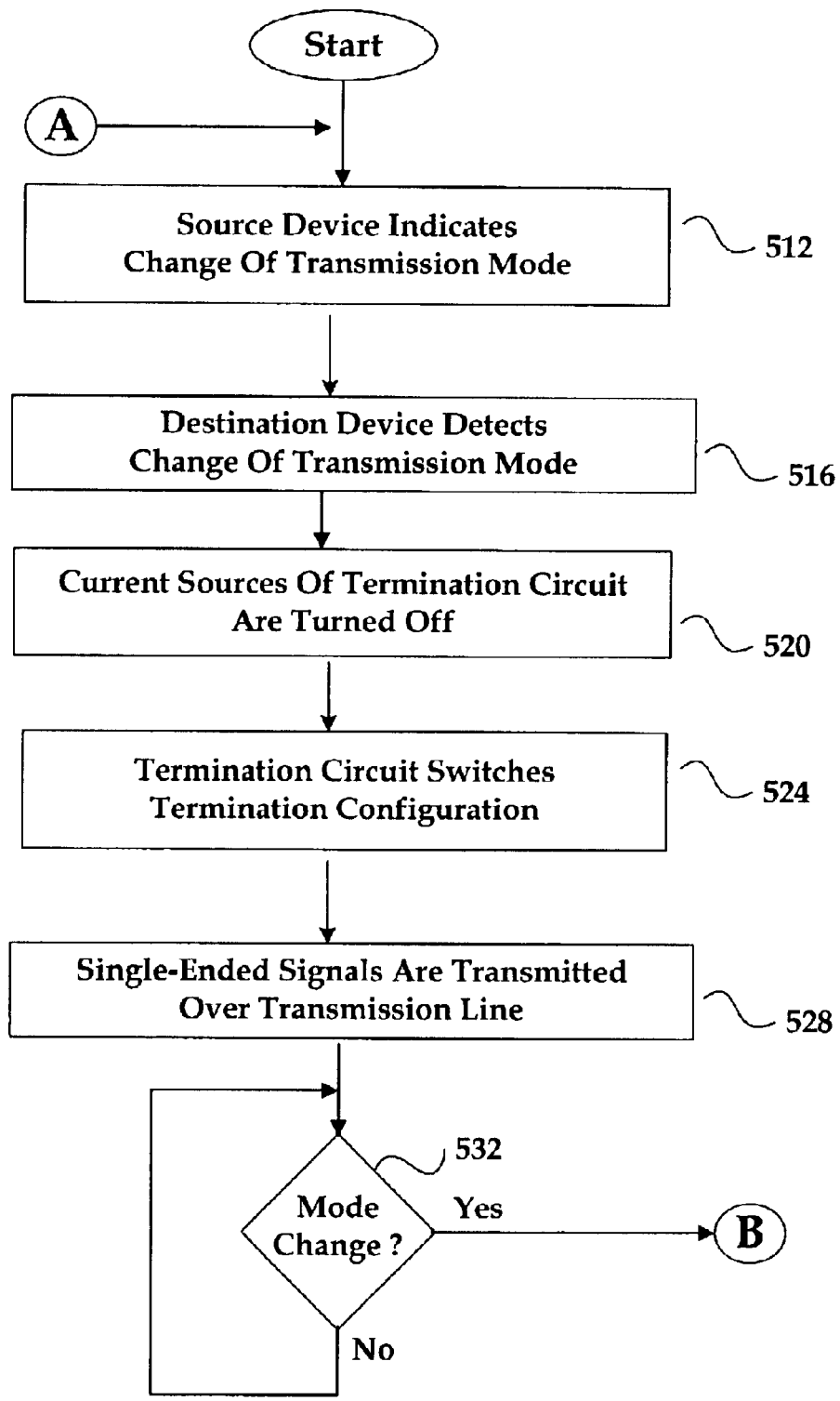
FIG. 5 is a flowchart of method steps for performing a differential/single-ended mode transition procedure with an active termination circuit, in accordance with one embodiment of the present invention.

Referring now to FIG. 5, a flowchart of method steps for performing a differential/single-ended mode transition procedure with an active termination circuit 410 is shown, in accordance with one embodiment of the present invention. The FIG. 5 example is presented for purposes of illustration, and in alternate embodiments, the present invention may readily utilize various steps and sequences other than those discussed in conjunction with the FIG. 5 embodiment.

In the FIG. 5 embodiment, initially, a transmission line 122 in an electronic system 110 may be operating in a differential transmission mode to transfer related differential signals from a source device to a destination device. In the FIG. 5 embodiment, transmission line 122 may be efficiently and effectively implemented to include a conductor A 126(a) and a conductor B 126(b).

In step 512, the foregoing source device may indicate a change of transmission mode by utilizing any appropriate means. Then in step 516, the foregoing destination device may detect the change of transmission mode in any effective manner. In step 520, current sources 436 from an active termination circuit 410 that is coupled to conductor A 126(a) and conductor B 126(b) may preferably be turned off by control logic 416 in response to detecting the indicated change of transmission mode. In step 524, the active termination circuit 410 may dynamically switch from a differential mode termination configuration to a single-ended mode termination configuration in response to control logic 416 turning off the foregoing current sources 436.

Then, in step 528, the source device may advantageously transmit single-ended signals over transmission line 122 to the destination device, in accordance with the present invention. In step 532, electronic system 110 may wait until another change of transmission mode is required for transmission line 122, at which point the FIG. 5 process may advance to step 612 of FIG. 6 via letter "B".

Figure 6:
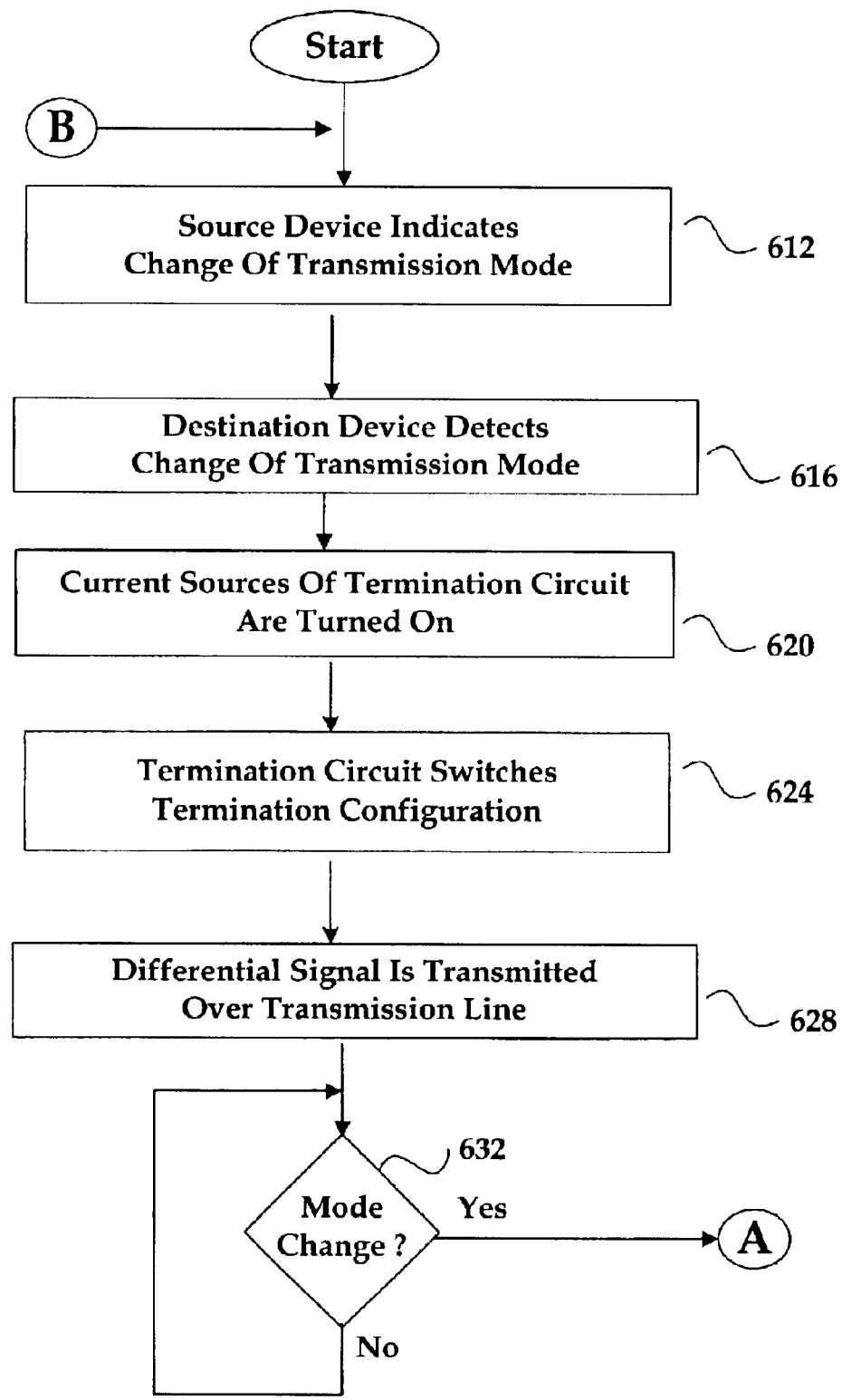
FIG. 6 is a flowchart of method steps for performing a single-ended/differential mode transition procedure with an active termination circuit, in accordance with one embodiment of the present invention.

Referring now to FIG. 6, a flowchart of method steps for performing a single-ended/differential mode transition procedure with an active termination circuit 410 is shown, in accordance with one embodiment of the present invention. The FIG. 6 example is presented for purposes of illustration, and in alternate embodiments, the present invention may readily utilize various steps and sequences other than those discussed in conjunction with the FIG. 6 embodiment.

In the FIG. 6 embodiment, initially, a transmission line 122 in an electronic system 110 may be operating in a single-ended transmission mode to transfer separate and individual signals from a source device to a destination device. In the FIG. 6 embodiment, transmission line 122 may be efficiently and effectively implemented to include a conductor A 126(a) and a conductor B 126(b).

In step 612, the foregoing source device may indicate a change of transmission mode by utilizing any appropriate means. Then in step 616, the foregoing destination device may detect the change of transmission mode in any effective manner. In step 620, current sources 436 from an active termination circuit 410 that is coupled to conductor A 126(a) and conductor B 126(b) may preferably be turned on by control logic 416 in response to detecting the indicated change of transmission mode. In step 624, the active termination circuit 410 may dynamically switch from a single-ended mode termination configuration to a differential mode termination configuration in response to control logic 416 turning on the foregoing current sources 436.

Then, in step 628, the source device may advantageously transmit differential signals over transmission line 122 to the destination device, in accordance with the present invention. In step 632, electronic system 110 may wait until another change of transmission mode is required for transmission line 122, at which point the FIG. 6 process may return to step 512 of FIG. 5 via letter "A". The present invention therefore provides an improved a system and method for effectively implementing an active termination circuit in an electronic device.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for effectively transferring electronic information, comprising:

a transmission line for transferring said electronic information between a source device and a destination device, said transmission line including a conductor A and a conductor B;

an active termination circuit coupled to said conductor A and said conductor B, said active termination circuit being dynamically switchable between a differential mode termination configuration and a single-ended mode termination configuration; and control logic configured to dynamically place said active termination circuit into said differential mode termination configuration during a differential transmission mode by placing current sources for said active termination circuit into an on-state, said control logic also dynamically placing said active termination circuit into said single-ended mode termination configuration during a single-ended transmission mode by placing said current sources into an off-state.

2. The system of claim 1 wherein said differential transmission mode is utilized to transfer a first high-speed differential data signal and a corresponding second high-speed differential data signal between said source device and said destination device, said first high-speed differential data signal being transferred on said conductor A, said corresponding second high-speed differential data signal being simultaneously transferred on said conductor B.

3. The system of claim 1 wherein said single-ended transmission mode is utilized to transfer control signals and a separate clock signal between said source device and said destination device, said control signals being transferred on said conductor A, and said separate clock signal being simultaneously transferred on said conductor B.

4. The system of claim 1 wherein said source device and said destination device are implemented in a hard-disk drive device, said source device being a first integrated circuit that includes control circuitry for performing read/write operations for said hard-disk drive device, said destination device being an associated second integrated circuit that is mounted near a read/write head device in said hard-disk drive device.

5. The system of claim 1 wherein said active termination circuit provides a selectable differential termination resistance between said conductor A and said conductor B during said differential transmission mode to thereby match an impedance of said transmission line for optimizing high-speed data transfer operations between said source device and said destination device.

6. The system of claim 1 wherein said active termination circuit provides a high-value single-ended termination resistance A between said conductor A and an electrical ground potential during said single-ended transmission mode, said active termination circuit also providing a high-value single-ended termination resistance B between said conductor A and said electrical ground potential during said single-ended transmission mode, said active termination circuit thus creating a substantially open circuit between said conductor A and said conductor B in said single-ended termination configuration to thereby isolate said conductor A from said conductor B.

7. The system of claim 1 wherein said control logic monitors said source device for a change indication that signifies a change of transmission mode.

8. A The system of claim 1 wherein said source device provides a change of transmission mode indication regarding said transmission line to said destination device for changing from said differential transmission mode to said single-ended transmission mode.

9. The system of claim 8 wherein said control logic of said destination device detects said change of transmission mode indication from said source device for changing from said differential transmission mode to said single-ended transmission mode.

10. The system of claim 9 wherein said control logic turns off one or more current sources of said active termination circuit after detecting said change of transmission mode indication.

11. The system of claim 10 wherein said active termination circuit changes from said differential termination configuration to said single-ended termination configuration after said one or more current sources have been turned off.

12. The system of claim 11 wherein said source device transmits a first single-ended signal over said conductor A to said destination device, said source device simultaneously transmitting a second single-ended signal over said conductor B to said destination device.

13. The system of claim 1 wherein said source device provides a change of transmission mode indication regarding said transmission line to said destination device for changing from said single-ended transmission mode to said differential transmission mode.

14. The system of claim 13 wherein said control logic of said destination device detects said change of transmission mode indication from said source device for changing from said single-ended transmission mode to said differential transmission mode.

15. The system of claim 14 wherein said control logic turns on one or more current sources of said active termination circuit after detecting said change of transmission mode indication.

16. The system of claim 15 wherein said active termination circuit changes from said single-ended termination configuration to said differential termination configuration after said one or more current sources have been turned on.

17. The system of claim 16 wherein said source device transmits a first differential signal over said conductor A to said destination device, said source device simultaneously transmitting a corresponding second differential signal over said conductor B to said destination device.

18. The system of claim 1 wherein said transmission line, said active termination circuit, and said control logic are embodied ma driver integrated circuit device for a hard-disk drive.

19. A system for effectively transferring electronic information, comprising:

a transmission line for transferring said electronic information between a source device and a destination device, said transmission line including a conductor A and a conductor B;

an active termination circuit coupled to said conductor A and said conductor B, said active termination circuit being dynamically switchable between a differential mode termination configuration and a single-ended mode termination configuration, said active termination circuit including a transistor A that is configured as a first diode device by directly connecting a base of said transistor A to a collector of said transistor A, a current source A then being directly connected to said collector of said transistor A, an emitter of said transistor A being connected to a first end of an emitter resistor A, a second end of said emitter resistor A being connected to a current source C, a transistor B being similarly configured as a second diode device by directly connecting a base of said transistor B to a collector of said transistor B, a current source B then being directly connected to said collector of said transistor B, an emitter of said transistor B being connected to a first end of an emitter resistor B, a second end of said emitter resistor B being directly connected to said current source C by a connecting line which is also directly connected to said second end of said emitter resistor A; and control logic configured to dynamically place said active termination circuit into said differential mode termination configuration during a differential transmission mode, said control logic also dynamically placing said active termination circuit into said single-ended mode termination configuration during a single-ended transmission mode.

20. The system of claim 19 wherein said conductor A is connected to a first line that connects said current source A and said collector of said transistor A, said conductor A being be coupled to device circuitry in said destination device, said conductor B being connected to a second line that connects said current source B and said collector of said transistor B, said conductor B also being coupled to said device circuitry of said destination device.

21. A method for effectively transferring electronic information, comprising:
providing a transmission line for transferring said electronic information between a source device and a destination device, said transmission line being implemented to include a conductor A and a conductor B;
coupling an active termination circuit to said conductor A and said conductor B, said active termination circuit being dynamically switchable between a differential mode termination configuration and a single-ended mode termination configuration; and
utilizing control logic to dynamically place said active termination circuit into said differential mode termination configuration during a differential transmission mode by placing current sources for said active termination circuit into an on-state, said control logic also dynamically placing said active termination circuit into said single-ended mode termination configuration during a single-ended transmission mode by placing said current sources into an off-state.

22. The method of claim 21 wherein said differential transmission mode is utilized to transfer a first high-speed differential data signal and a corresponding second high-speed differential data signal between said source device and said destination device, said first high-speed differential data signal being transferred on said conductor A, said corresponding second high-speed differential data signal being simultaneously transferred on said conductor B.

23. The method of claim 21 wherein said single-ended transmission mode is utilized to transfer control signals and a separate clock signal between said source device and said destination device, said control signals being transferred on said conductor A, and said separate clock signal being simultaneously transferred on said conductor B.

24. The method of claim 21 wherein said source device and said destination device are implemented in a hard-disk drive device, said source device being a first integrated circuit that includes control circuitry for performing read/write operations for said hard-disk drive device, said destination device being an associated second integrated circuit that is mounted near a read/write head device in said hard-disk drive device.

25. The method of claim 21 wherein said active termination circuit provides a selectable differential termination resistance between said conductor A and said conductor B during said differential transmission mode to thereby match an impedance or said transmission line for optimizing high-speed data transfer operations between said source device and said destination device.

26. The method of claim 21 wherein said active termination circuit provides a high-value single-ended termination resistance A between said conductor A and an electrical ground potential during said single-ended transmission mode, said active termination circuit also providing a high-value single-ended termination resistance B between said conductor A and said electrical ground potential during said single-ended transmission mode, said active termination circuit thus creating a substantially open circuit between said conductor A and said conductor B in said single-ended termination configuration to thereby isolate said conductor A from said conductor B.

27. The method of claim 21 wherein said control logic monitors said source device for a change indication that signifies a change of transmission mode.

28. The method of claim 21 wherein said source device provides a change of transmission mode indication regarding said transmission line to said destination device for changing from said differential transmission mode to said single-ended transmission mode.

29. The method of claim 28 wherein said control logic of said destination device detects said change of transmission mode indication from said source device for changing from said differential transmission mode to said single-ended transmission mode.

30. The method of claim 29 wherein said control logic turns off one or more current sources of said active termination circuit after detecting said change of transmission mode indication.

31. The method of claim 28 wherein said active termination circuit changes from said differential termination configuration to said single-ended termination configuration after said one or more current sources have been turned off.

32. The method of claim 31, wherein said source device transmits a first single-ended signal over said conductor A to said destination device, said source device simultaneously transmitting a second single-ended signal over said conductor B to said destination device.

33. The method of claim 21 wherein said source device provides a change of transmission mode indication regarding said transmission line to said destination device for changing from said single-ended transmission mode to said differential transmission mode.

34. The method of claim 33 wherein said control logic of said destination device detects said change of transmission mode indication from said source device for changing from said single-ended transmission mode to said differential transmission mode.

35. The method of claim 34 wherein said control logic turns on one or more current sources of said active termination circuit after detecting said change of transmission mode indication.

36. The method of claim 35 wherein said active termination circuit changes from said single-ended termination configuration to said differential termination configuration after said one or more current sources have been turned on.

37. The method of claim 36 wherein said source device transmits a first differential signal over said conductor A to said destination device, said source device simultaneously transmitting a corresponding second differential signal over said conductor B to said destination device.

38. A method for effectively transferring electronic information, comprising:
providing a transmission line for transferring said electronic information between a source device and a destination device, said transmission line being implemented to include a conductor A and a conductor B;

coupling an active termination circuit to said conductor A and said conductor B, said active termination circuit being dynamically switchable between a differential mode termination configuration and a single-ended mode termination configuration, said active termination circuit including a transistor A that is configured as a first diode device by directly connecting a base of said transistor A to a collector of said transistor A, a current source A then being directly connected to said collector of said transistor A, an emitter of said transistor A being connected to a first end of an emitter resistor A, a second end of said emitter resistor A being connected to a current source C, a transistor B being similarly configured as a second diode device by directly connecting a base of said transistor B to a collector of said transistor B, a current source B then being directly connected to said collector of said transistor B, an emitter of said transistor B being connected to a first end of an emitter resistor B, a second end of said emitter resistor B being directly connected to said current source C by a connecting line which is also directly connected to said second end of said emitter resistor A; and utilizing control logic to dynamically place said active termination circuit into said differential mode termination configuration during a differential transmission mode, said control logic also dynamically placing said active termination circuit into said single-ended mode termination configuration during a single-ended transmission mode.

39. The method of claim 38 wherein said conductor A is connected to a first line that connects paid current source A and said collector of said transistor A, said conductor A being also be coupled to device circuitry in said destination device, said conductor B being connected to a second line that connects said current source B and said collector of said transistor B, said conductor B also being coupled to said device circuitry of said destination device.

40. A system for effectively transferring electronic information, comprising:

means for transferring said electronic information between a source device and a destination device, said means for transferring being implemented to include a conductor A and a conductor B;

means for terminating said transmission line, said means for terminating being coupled to said conductor A and said conductor B, said means for terminating being dynamically switchable between a differential mode termination configuration and a single-ended mode termination configuration; and means for dynamically placing said means for terminating into said differential mode termination configuration during a differential transmission mode, and for also dynamically placing said means for terminating into said single-ended mode termination configuration during a single-ended transmission mode.

* * * * *